Dec. 8, 1925.

P. RUDOLPH

PHOTOGRAPHIC OBJECTIVE

Filed Sept. 1, 1922

Patented Dec. 8, 1925.

1,565,205

UNITED STATES PATENT OFFICE.

PAUL RUDOLPH, OF KLEINBIESNITZ, NEAR GORLITZ, GERMANY.

PHOTOGRAPHIC OBJECTIVE.

Application filed September 1, 1922. Serial No. 585,705.

*To all whom it may concern:*

Be it known that I, PAUL RUDOLPH, a citizen of the German Republic, residing at Kleinbiesnitz, near Gorlitz, Germany, have invented certain new and useful Improvements in Photographic Objectives (for which I have filed an application for patent in Germany on the 8th of February 1922), of which the following is a specification.

The modern photographic objectives are constructed with the object to get with a sufficient large relative aperture a useful picture field of a great angle of range. The demand of the portrait photography, of the microphotography and of the cinematography for objectives possessing great intensity of light has been somewhat neglected. These objectives do not suppose a specially large picture field.

The known anastigmates do generally not exceed the aperture of 1 : 3,5. According to the invention the aperture is enlarged to approximately 1 : 1,5. The zones of the spherical and spherochromatic correction are remarkably small so that the objective is well adapted to be used with specially good results for micro-enlargements.

The improved objective is composed of four members separated by air, two convex-concave diverging members which form the inner constituent and two scalenely collecting members which form the outer constituent of the lens and have the stronger curvature turned to the outer side the air distance between the two diverging members being smaller than the sum of the two distances between the diverging and the collecting lenses. According to the invention the two halves of the objective separated by the diaphragm are proportional the one to the other as regards the glass-materials, radii, thicknesses and distances of the lenses.

An objective of this type is built essentially symmetrical to the diaphragm but it could also be, for special purposes, hemi-symmetrical. The halves separated by the diaphragm can further be spherically corrected each for itself or not. The chromatic correction is not of great importance per se it can be ensured or neglected for special purposes. Objectives with small aperture could be produced also, if namely the sperical zones have to be of the smallest possible size, for instance for reproduction.

For ensuring a good chromatic or astigmatic correction of objectives of very large aperture it is advisable to cement together one or two lenses of a positive member of lesser dispersion and of a negative member of stronger dispersion, as indicated in examples 2 and 3. The exponents of refraction of these constituents can be equal or different.

Figure 1:
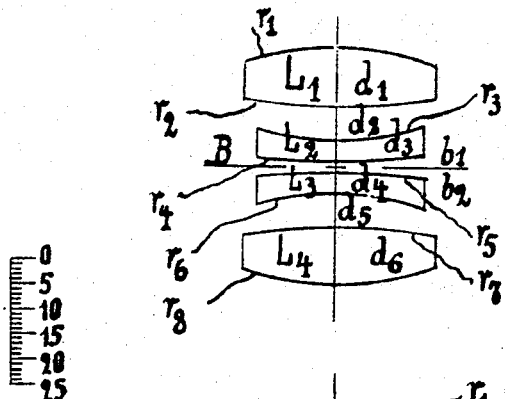
Figure 2:
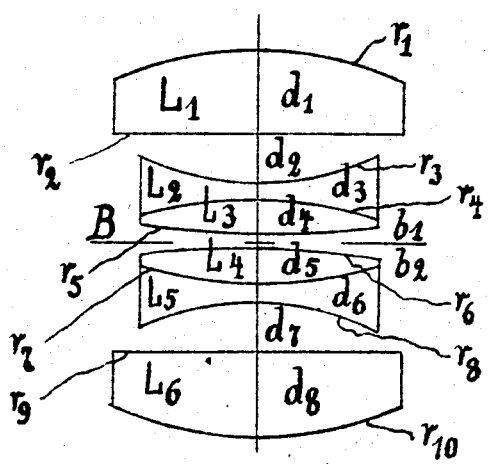
Figure 3:
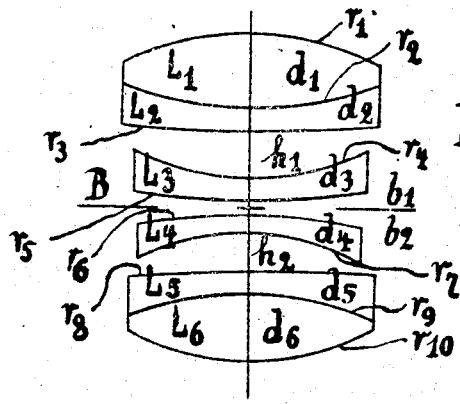

In the drawing each of the Figures 1, 2 and 3 illustrates one of the examples of construction of the improved photographic objectives.

In the following three examples of construction the letters of reference correspond with those of the drawing. The figures are indicated in the scale on the drawing. In the figures B designates the diaphragm of the objective.

Example No. 1.

All four members (Fig. 1) are uncemented lenses, the relative aperture is 1 : 2,5, the focal distance is 100 mm., the lens diameter of the outer members is 40 mm., the lens diameter of the inner members is 34 mm.

| Radii. | Thickness and distances. |
|---|---|
| $r_1 = -r_8 = +58.94$ mm. | $d_1 = d_6 = 10.16$ mm. |
| $r_2 = -r_7 = -365.80$ mm. | $d_2 = d_5 = 6.10$ mm. |
| $r_3 = -r_6 = -56.91$ mm. | $d_3 = d_4 = 4.06$ mm. |
| $r_5 = -r_5 = -152.40$ mm. | $b_1 = b_2 = 1.00$ mm. |

Kinds of glass.

$L_1 = L_4 : nD = 1.610, \ nG' = 1.622$
$L_2 = L_3 : nD = 1.624, \ nG' = 1.648$

Example No. 2.

The two inner members (Fig. 2) are cemented of two lenses $L_2 + L_3$, $L_4 + L_5$, the positive part $L_3$, $L_4$ has less diverging force than the negative part $L_2$, $L_5$. The halves separated by the diaphragm are spherically corrected.

Relative aperture of the total objective=1 : 1.7
Relative aperture of the half objective=1 : 3.4
Focal distance of the total objective=100 mm.
Focal distance of one half=166 mm.
Lens diameter of the outer members=59 mm.
Lens diameter of the inner members=49 mm.

| Radii. | Thickness and distances. |
|---|---|
| $r_1 = -r_{10} = +72.90$ mm. | $d_1 = d_8 = 16.98$ mm. |
| $r_2 = -r_9 = -243.00$ mm. | $d_2 = d_7 = 9.69$ mm. |
| $r_3 = -r_8 = -55.89$ mm. | $d_3 = d_6 = 2.40$ mm. |
| $r_4 = -r_7 = +85.06$ mm. | $d_4 = d_5 = 7.29$ mm. |
| $r_5 = -r_6 = -182.30$ mm. | $b_1 = b_2 = 1.22$ mm. |

Kinds of glass.

$L_1 = L_6 = L_3 = L_4 : nD = 1.621, \ nG' = 1.635$
$L_2 = L_5 : nD = 1.540, \ nG' = 1.555$

Example No. 3.

The objective (Fig. 3) possesses an aperture of 1 : 2 and is built up hemi-symmetrically. The halves separated by the diaphragm are of equal construction, but their focal distances are different. The focal distance of the total objective shown is =100, that of the front half =163, that of the rear half =141. The lens diameters are for $L_1$ and $L_2$ 53 mm., for $L_3$ 48 mm., for $L_4$ 46 mm., for $L_5$ and $L_6$ 50 mm.

| Radii. | Thickness and distances. |
|---|---|
| $r_1= +\ 59.04 : r_6 = +144.50$ | $d_1=15.28 : b_2=\ \ 0.97$ |
| $r_2=-\ 76.40 : r_7 = +\ 48.16$ | $d_2=\ \ 4.38 : d_4=\ \ 3.86$ |
| $r_3=-655.00 : r_8 = +577.90$ | $h_1=\ \ 8.72 : h_2=\ \ 7.70$ |
| $r_4=-\ 54.59 : r_9 = +\ 67.43$ | $d_3=\ \ 4.38 : d_5=\ \ 3.86$ |
| $r_5=-163.74 : r_{10}= -\ 52.21$ | $b_1=\ \ 1.10 : d_6=13.50$ |

Kinds of glass.
$L_1=L_6 : nD=1.62181\ \ nG'=1.63516$
$L_2=L_5 : nD=1.54630\ \ nG'=1.56173$
$L_3=L_4 : nD=1.62600\ \ nG'=1.64903$ In the above stated three examples of application the two halves of the objective are, as regards glass material, equal the one to the other. As regards radii, thicknesses and distances between the lenses the multiplicator of the proportion is in Example No. 1—1, and in Example No. 3 the multiplier for the second half is 0.883 in relation to the first half of the objective.

I claim:—

In an objective, with middle diaphragm, composed of four members separated from another by air the convex surfaces of the two convex-concave diverging members which form the inner constituents facing one another and the two collecting members which form the outer constituents having the stronger curvature turned to the outer side, the air distance between the two diverging members being smaller than the sum of the two distances between the diverging lenses and the collecting lenses, the arrangement that, as regards, radii, thicknesses and distances between the lenses the two halves of the objective are each proportional to the other and as regards glass materials the two halves of the objective are equal the one to the other.

In testimony whereof I affix my signature.

PAUL RUDOLPH.